United States Patent [19]

Chan et al.

[11] Patent Number: 4,930,018

[45] Date of Patent: May 29, 1990

[54] METHOD AND SYSTEM FOR ENHANCING THE QUALITY OF BOTH COLOR AND BLACK AND WHITE IMAGES PRODUCED BY INK JET PRINTERS

[75] Inventors: C. S. Chan; James G. Bearss; Terry M. Nelson, all of Boise, Id.

[73] Assignee: Hewlett-Packard Company, Palo Alto, Calif.

[21] Appl. No.: 278,881

[22] Filed: Dec. 2, 1988

[51] Int. Cl.$^5$ ............... H04N 1/034; H04N 1/23; G01D 15/16; B41J 2/21

[52] U.S. Cl. ............... 358/298; 346/140 R; 346/1.1; 400/126

[58] Field of Search ............... 346/140 PD, 1.1; 358/283, 298, 75, 296; 400/126

[56] References Cited

U.S. PATENT DOCUMENTS

| | | | |
|---|---|---|---|
| 4,233,663 | 11/1980 | Sugawara | 358/296 |
| 4,503,444 | 3/1985 | Tacklind | 346/140 PD |
| 4,595,948 | 6/1986 | Itoh | 358/75 |
| 4,635,078 | 1/1987 | Sakurada | 346/140 PD |
| 4,638,373 | 1/1987 | Logan | 358/298 |
| 4,672,432 | 6/1987 | Sakurada | 346/140 PD |
| 4,680,596 | 7/1987 | Logan | 346/140 PD |
| 4,686,538 | 8/1987 | Kouzato | 346/140 PD |
| 4,714,964 | 12/1987 | Sasaki | 358/298 |
| 4,746,935 | 5/1988 | Allen | 358/298 |
| 4,772,911 | 9/1988 | Sasaki | 358/298 |

Primary Examiner—Bruce A. Reynolds
Assistant Examiner—Scott A. Rogers
Attorney, Agent, or Firm—Hewlett-Packard Company

[57] ABSTRACT

A method for reducing "grainyness" or color contrast in color imaging systems and simultaneously reducing or eliminating paper cockleing of media printed by ink jet printing. The method involves determining the maximum allowable ink print density necessary to reduce or eliminate paper cockleing in the printed media and then providing tight control of the selection of gray scale ink drop count and associated dye loading in relation to this maximum allowable print density. Using this method, pixels are selected and printed in such a manner as to maximize the uniformity of ink distribution on the printed media.

This method will work using either a variable drop size or a fixed drop size with variable dye loadings. It will also work with most error diffusion or dithering schemes presently used and available in the image processing arts.

37 Claims, 6 Drawing Sheets

16 Levels Gray Table

Based on 2x2 super-pixel

*Define density (reflectance) ratio to be:*

$d1:d2:d3 = 4:2:1$

| LEVEL | 1/4 | 2/4 | 3/4 | 4/4 |
|---|---|---|---|---|
| 1 | (0,0,1) | | | |
| 2 | (0,1,0) | (0,0,2) | | |
| 3 | | (0,1,1) | (0,0,3) | |
| 4 | (1,0,0) | (0,2,0) | (0,1,2) | (0,0,4) |
| 5 | | (1,0,1) | (0,2,1) | |
| 6 | | (1,1,0) | (0,3,0) | |
| 7 | | | (1,1,1) | (1,0,3) |
| 8 | | (2,0,0) | (1,2,0) | (0,4,0) |
| 9 | | | (2,0,1) | (1,2,1) |
| 10 | | | (2,1,0) | (2,0,2) |
| 11 | | | | (2,1,1) |
| 12 | | | (3,0,0) | |
| 13 | | | | (3,0,1) |
| 14 | | | | (3,1,0) |
| 15 | | | | |
| 16 | | | | (4,0,0) |

*Fig. 2A*

32 Levels Gray Table

Based on 2×2 super-pixel

*Define density (reflectance) ratio to be:*

$d1:d2:d3 = 8:3:1$

| LEVEL | 1/4 | 2/4 | 3/4 | 4/4 |
|---|---|---|---|---|
| 1 | (0,0,1) | | | |
| 2 | | (0,0,2) | | |
| 3 | (0,1,0) | | (0,0,3) | |
| 4 | | (0,1,1) | | |
| 5 | | | (0,1,2) | |
| 6 | | (0,2,0) | | |
| 7 | | | (0,2,1) | |
| 8 | (1,0,0) | | | (0,2,2) |
| 9 | | (1,0,1) | | |
| 10 | | | (1,0,2) | |
| 11 | | (1,1,0) | | (1,0,3) |
| 12 | | | (1,1,1) | |
| 13 | | | | (1,1,2) |
| 14 | | | (1,2,0) | |
| 15 | | | | (1,2,1) |
| 16 | | (2,0,0) | | |
| 17 | | | (2,0,1) | |
| 18 | | | | (2,0,2) |
| 19 | | | (2,1,0) | |
| 20 | | | | (2,1,1) |
| 21 | | | | |
| 22 | | | | (2,2,0) |
| 23 | | | | |
| 24 | | | (3,0,0) | |
| 25 | | | | (3,0,1) |
| 26 | | | | |
| 27 | | | | (3,1,0) |
| 28 | | | | |
| 29 | | | | |
| 30 | | | | |
| 31 | | | | |
| 32 | | | | (4,0,0) |

Fig. 2B

Example of filling in the image plane

Example

|   | High | Medium | Low |
|---|---|---|---|
| K = ( | 2, | 2, | 0 ) |
| C = ( | 2, | 2, | 0 ) |
| M = ( | 1, | 0, | 2 ) |
| Y = ( | 0, | 1, | 0 ) |

METHOD AND SYSTEM FOR ENHANCING THE QUALITY OF BOTH COLOR AND BLACK AND WHITE IMAGES PRODUCED BY INK JET PRINTERS

TECHNICAL FIELD

This invention relates generally to the recording of color and black and white images using digital image processing techniques. More particularly, the invention is directed to a method and system for improving the quality of such images using state-of-the-art ink jet printers and gray scale or halftoning techniques.

BACKGROUND ART

For several years now, it has been known to convert both color and black and white images scanned using a variety of image sensors to an output ink recording of various types of printers, such as ink jet printers. One example of such an image conversion system is disclosed in U.S. Pat. No. 4,672,432 assigned to Canon of Japan, and this system is capable of converting red, blue and green colors of a picture taken by a scanner into cyan, yellow and magenta color outputs from an ink jet printer. The subject matter of this U.S. patent is incorporated herein by reference.

More recently, significant developments have been made in the art of thermal ink jet color printing. An example of one such development was the introduction by the present assignee, Hewlett-Packard Company, in 1987 of its multicolor thermal ink jet printer sold under the trademark "PaintJet". This printer is described in detail in the *Hewlett-Packard Journal*, Vol. 39, No. 4 published in August 1988 and incorporated herein by reference. Other newly available color ink jet printers have been recently described in numerous trade journals, and an example of such publication is an article in *Personal Computing* magazine by W. L. Rosch entitled "New Printers Banish Black and White", May 31, 1988, at page 168 et seq.

While these color ink jet printers have been generally well received and operate satisfactorily in most respects, some of the images recorded by these printers have exhibited a certain undesirable color contrast or "grainyness" which detracts from the quality of the recorded image. There are two ways of reducing this "grainyness" or undesirable color contrast, and one way involves using a higher dots per inch (dpi) resolution whereas the other way involves the use of gray scale techniques. The present invention falls into the latter category.

DISCLOSURE OF INVENTION

Accordingly, it is an object of the present invention to provide a new and improved method and system which is operative to reduce such undesirable color contrast and grainyness of images recorded by ink jet printers, thereby improving the quality of such recorded images.

Another object is to provide a new and improved method and system of the type described which achieves such improved image quality without any sacrifice in resolution and without using a higher resolution print density. The disadvantage of going to higher resolutions is that it results in slower print times, requires more nozzles and requires operating the nozzles at a higher print frequency.

Another object is to provide a new and improved method and system of the type described which is readily and economically adaptable for use with state-of-the-art thermal ink jet printers without requiring an increase in the dot printing density of these printers.

A further object of this invention is to provide a new and improved method and system of the type described which is able to accomplish the above objects while simultaneously and additionally minimizing the amount of paper cockleing produced during ink jet printing.

A feature of this invention is the provision of a unique error diffusion and pixel assignment gray scaling stage for a color image conversion-to-hardcopy output electronic system. This gray scaling stage includes, among other things, means for controlling the ejection of ink onto a print medium in a pixel address sequence controlled by the value of gray scale numbers to which said image information is assigned.

Another feature of this image conversion system is its ability to match an ink loaded drop to a selected print area for receiving the drop in a manner to enhance print quality from an ink jet printing operation. This system includes means for scanning an image to generate digital data representative thereof, means connected to the scanning means for converting the digital data to gray scale digital information, and means connected to the converting means for processing the digital information in such a manner as to prevent the volume of the ink loaded drop from exceeding a preselected maximum allowable ink drop volume, $V_{max}$.

The above image conversion system also features means for generating cyan, yellow, magenta and black pixel information, means connected to receive the pixel information and for assigning the information a gray scale drop count number based upon a count of ink drops and the dye loading thereof, and means connected to the assigning means for decrementing the drop count number to a desired and selectable lower level number on the gray scale.

The above image conversion system also features means for printing sub-divided super pixels in response to scanning rows of black, cyan, magenta and colors of first a high dye loading, then a medium dye loading and finally a low dye loading. In this process, the ink printed in successively printed pixels is distributed over the printed media to assure maximum print quality and minimum color contrast.

The above objects and other features and advantages of this invention are accomplished by, among other things, providing a controlled ink drop count and corresponding selected dye loading for ejection into addressable pixels. These pixels are defined by a plurality of row and column locations in a chosen gray scale matrix. This drop count and corresponding dye loading are representative of digital gray scale information generated by scanning a chosen image, and this information is used to select the ink drop count and dye loadings used in an ink jet printer. Ink drop volumes of each drop count and dye loading are computed, and the sum of the measured ink drop volumes are compared with a predetermined maximum allowable ink drop volume ($V_{max}$) to be received by a selected print medium. Minimum paper cockleing will occur if the chosen ink drop volume does not exceed $V_{max}$ for a given area of print media. An ink volume difference or error signal is generated in response to such comparison, and this error signal is in turn used to select the optimum drop count and dye loading for minimum color contrast for each level of gray scale printed.

It is necessary to control $V_{max}$ for different kinds of print media and for different inks printed thereon in order to minimize paper cockleing. This is a condition where the paper expands or contracts unevenly and becomes rough and uneven where too much ink is received in certain area thereon. However, within this limitation of $V_{max}$, the present invention will operate to maximize the drop count number and thus maximize the number of drop counts within a given printed surface area, such as for example a 2×2 pixel. This feature in turn has the effect of minimizing color contrast in the printed image.

In a preferred embodiment of the invention, we provide a novel method for minimizing color contrast in a printed image which includes generating cyan (C), yellow (Y), magenta (M) and black (K) pixel information and assigning this information a gray scale number based upon a count of ink drops and dye loading of the drops. Then, this assigned number is decremented to a selected lower digital number in a given level of gray scale or a lower digital number in a lower level of gray scale in response to a measure of the number of ink drops and their dye loading representative of scanned C, Y, M and K pixel information. The system and method according to the present invention further includes means for assigning each digit of the finally adjusted gray scale number to a selected pixel within a larger or super pixel. The particular pixel selection process is based upon the numerical value of the adjusted gray scale number.

BRIEF DESCRIPTION OF THE DRAWINGS

FIG. 2A is a table of 16 levels of gray scale and is based upon the use of a two-by-two super pixel.

FIG. 2B is a table of 32 levels of gray scale and is also based upon the use of a two-by-two super pixel.

FIGS. 3C and 3D are enlargements of the schematic flow chart in FIG. 3B and are included to enlarge the legend of FIG. 3B and make this legend easier to read.

DESCRIPTION OF THE PREFERRED EMBODIMENT

Figure 1:
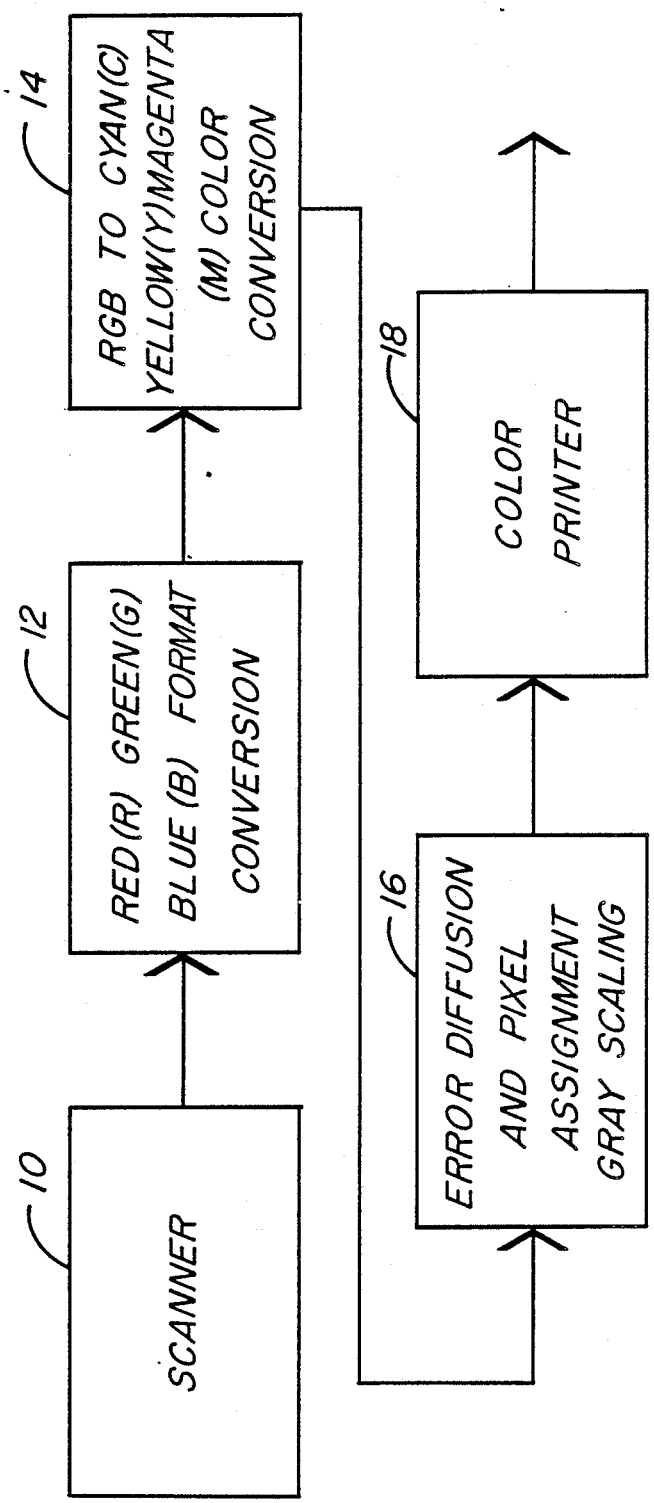
FIG. 1 is a functional block diagram of the image conversion system according to the present invention.

Referring now to FIG. 1, a scanner 10 may be used to convert a color image into digital gray scale data for application to an additive red-green-blue (R-G-B) format conversion stage 12. The R-G-B output data from the format conversion stage 12 is applied as indicated to the subtractive color primaries cyan-yellow-magenta (C-Y-M) color conversion stage in a well known manner and including 100% undercolor removal to obtain black. A chromatic color (black) cannot be easily made by mixing Y-M-C ink colors, and such mixing will increase the amount of ink consumed. Therefore, the black created by YMC colors is more preferable replaced by pure black (K). This replacement and the generation of pure black is known in the art as undercolor correction or undercolor removal (UCR).

The use of 100% undercolor removal is for the purpose of minimizing ink consumption and to improve resolution. The equation for 100% UCR for colors C, M, Y and K is K=min (C, M, Y) where the new C=C-K, the new M=M-K and the new Y=Y-K.

The output of the C-Y-M color conversion stage 14 is a digital data stream which is applied to the error diffusion and pixel assignment stage 16, and the latter stage in turn drives a color printer 18, preferably a thermal ink jet color printer. The general functional arrangement of the image scanning and reproduction system of FIG. 1 is generally well known in the image processing art. The image processing operation and capability of such a system is described, for example, in the March 1987 issue of *BYTE* Magazine in an article by B. M. Dawson entitled "Introduction To Image Processing Algorithms" at page 169 et seq. Such image processing capability and corresponding system operation is also described in a publication by Gary Dispoto et al. entitled *Designer's Guide to Raster Image Printer Algorithms*, First Edition, December 1986, Copyrighted by and available from the Hewlett-Packard Company in Palo Alto, Calif. Both of these latter references are incorporated herein by reference.

The processes of error diffusion and pixel assignment in a gray scaling image processing operation are also generally well known in this art. Error diffusion is a technique used to disperse to the neighboring pixels the error between a printable gray scale and the input image data gray scale. This error diffusion has been frequently carried out using a selected one of many well known algorithms such as those discussed in the above identified Dawson article. As an example, this error diffusion may be carried our using either one of two well known algorithms in this art, namely, Floyd and Steinberg's 4-point algorithms and Stucke's 12-point algorithms.

In 1976, Robert W. Floyd and Lewis Steinberg published a paper in the *Proceedings of the Society of Information Display*, Vol. 17/2 entitled "An Adaptive Algorithm For Spacial Gray Scale", and in this article there is described an algorithm which is entitled "Error Diffusion". As indicated above and described in detail in the Floyd and Steinberg paper, error diffusion is a technique used to disperse the difference between the actual gray scale of the read pixel values and the subsequently assigned row and column (i,j) gray scale of a look-up gray table into the pixels which surround the assigned gray scale pixels. This error diffusion is done in such a manner as to minimize smearing of the image reproduced. The above Floyd and Steinberg paper is incorporated herein by reference.

Other error diffusion techniques are identified in U.S. Pat. No. 4,680,645 issued to Dispoto et al., assigned to the present assignee and also incorporated herein by reference.

Referring now to FIG. 2A, there is shown a 16 level gray table based upon a two-by-two super pixel and also based upon a high-medium-low dye loading for each 3 digit gray scale number and weighted as indicated to be in the reflectance density ratio of 4:2:1. Thus, the left hand digit of each gray scale number in each row and column of the 16 level gray table in FIG. 2A represents a high (H) dye loading, the middle digit of each 3-digit gray scale number represents the medium (M) dye loading and the right hand digit of each number represents a low (L) dye loading for each drop of ink ejected onto a pixel. Each of these H, M and L dye loadings is selected to give a 4:2:1 reflectance ratio on the printed page as will be understood by those skilled in the art.

The numbers 1, 2, 3 and 4 appearing in brackets in FIG. 2A represent the ink drop count, or the number of ink drops associated with a particular level of dye loading. This combination of drop count and dye loading will in turn yield a specific gray scale level which is assigned to the pixel values actually read by the scanner 10 in FIG. 1. This assigned gray scale value is the closest gray scale number in the gray table in FIG. 2 to the actually read pixel values.

The blank areas of the table shown in FIG. 2B to which no drop count numbers are assigned are all (0, 0, 0). Therefore, the 3 digit drop count gray scale numbers shown in FIG. 2B are the only numbers in the 16-level gray table having one or more positive digits of either a 1, 2, 3 or 4 value corresponding to available drop counts within the 16 gray scale levels.

There are actually 256 levels in a complete gray scale used in practicing this invention. This number 256 is a convenient even number in the digital signal processing art and has far more resolution in gray scale than is normally needed. The human eye can resolve only about 50 gray levels between maximum white and maximum black. Also, the number 256 is a typical level resolution number for the scanner 10. Therefore, each of the 16 levels in FIG. 2B represent one sixteenth of the total 256 level gray scale. Thus, in level one (1) of the table in FIG. 2B, the (0, 0, 1) notation indicates that the only available drop count and dye loading for achieving a level one of the gray table is a single drop or drop count having a low (L) or one weighted dye loading. Similarly, a level two of gray scale may be achieved by using either one drop of a medium (M) dye loading (0, 1, 0) or two drops of a low dye loading (0, 0, 2), as indicated in level two of the table, and so on down the table. However, it will be understood by those skilled in the art that many other gray levels may be used instead of the 16 levels indicated in FIG. 2B.

For example, a 32 level gray table is especially well suited for use in practicing the present invention and would be used in combination with a 8:3:1 reflectance ratio in an arrangement shown in FIG. 2B. It will be observed in FIG. 2B that level 15 of the table has no exact available gray scale number for achieving the exact level 15 or 15/16ths of the total 256 level gray scale. Level 15 can be achieved by using a level 14 in combination with an error diffusion. The selection of the above gray scale numbers in FIGS. 2A and 2B which define and control the available drop counts and dye loadings will become better understood in the following descriptions of FIGS. 3-4.

Figure 3A:
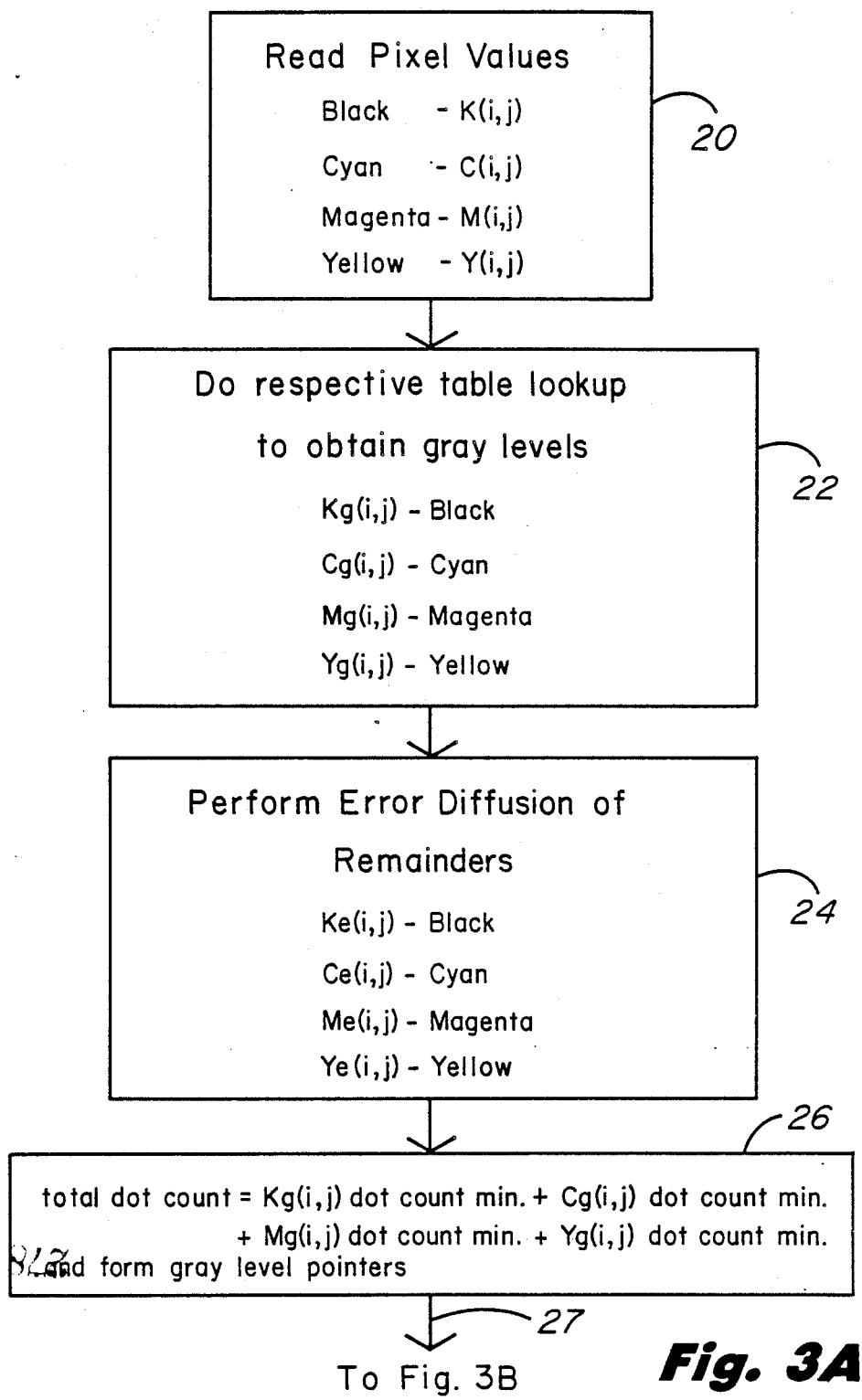
FIGS. 3A and 3B are respectively the upper and lower portions of a schematic flow chart depicting the data processing methodology and structure used for controlling the operation of the error diffusion and pixel assignment gray scaling stage in FIG. 1.
Figure 3B:
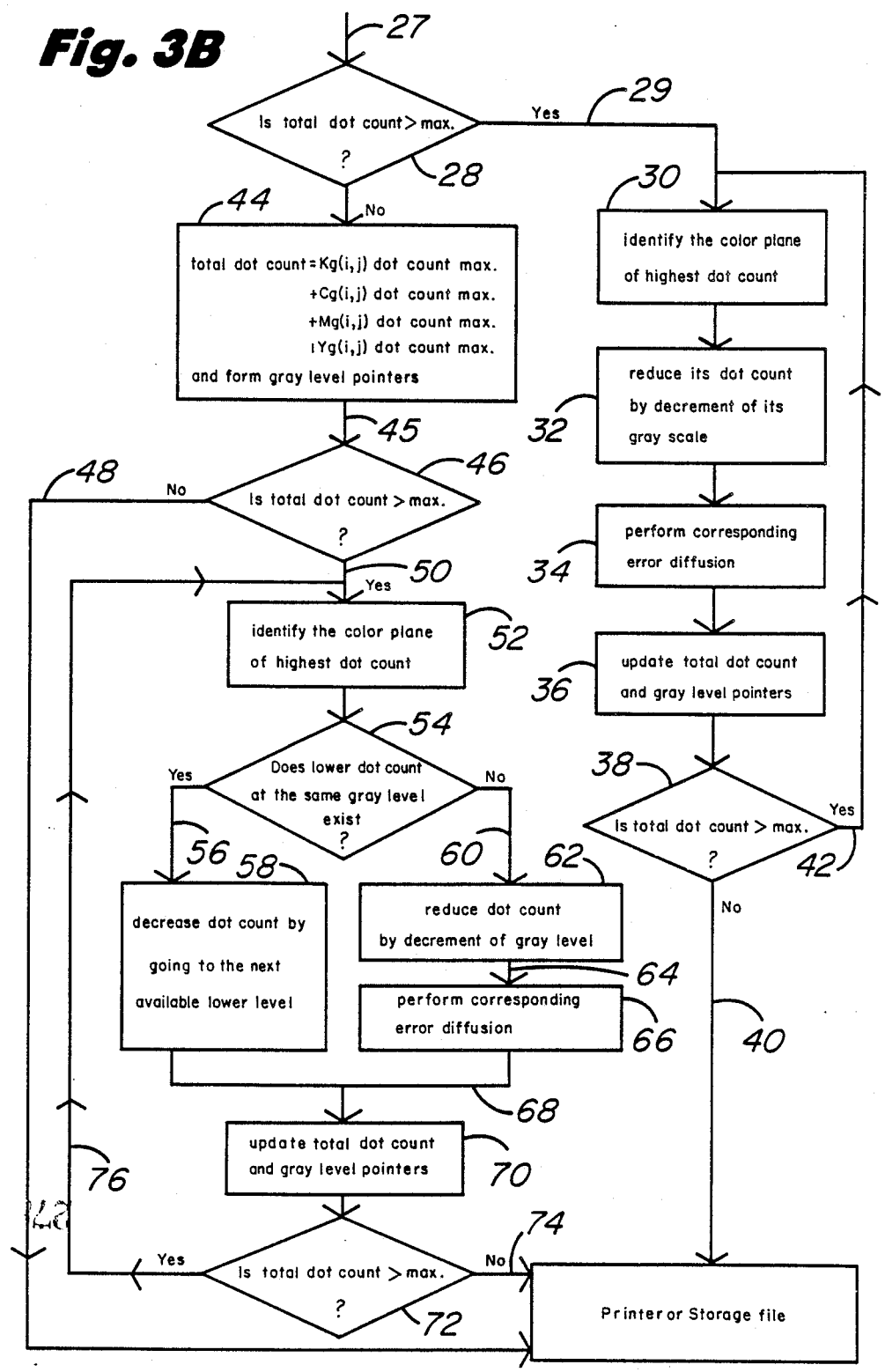

Referring now to FIGS. 3A and 3B, the data processing system shown in these two connected figures provides a detailed explanation of the operation of the error diffusion and pixel assignment stage 16 in FIG. 1. This data processing system is comprised of a number of functional blocks which include therein descriptive legend to aid in the reader's understanding of the invention. These functional blocks are actually individual stages of a computer, and as such are sometimes alternatively referred to as "stages" or "test stages" in the case of performing a yes-no test on a particular piece of data. The test stages in this system are indicated by the diamond shaped functional blocks, whereas the other operational stages which perform a specific functional operation on the incoming data are rectangular in shape. However, for the ease of describing this data processing system and its two feedback loops, each of the functional blocks or stages therein will be referred to hereinafter as "steps" in order to generically indicate the functional steps performed on the data being operated on in each of the electronic stages.

As indicated at step 20, each of the black, cyan, magenta and yellow pixel values are read by the scanner 10 in FIG. 1 and converted to C, Y, M and K digital data, each having a row and column, (i, j,) within the 256 level gray scale. As indicated at step 22, each of the black, cyan, magenta and yellow gray levels from step 20 are assigned their closest corresponding gray scale number within the gray table of FIG. 2B, and the difference between the actual and assigned gray levels are diffused by error diffusion at step 24 into the surrounding pixels as previously described.

At step 26, a total drop count is calculated for the black, cyan, magenta and yellow minimum available drop count numbers within the 16 level gray table of FIG. 2B, and this drop count minimum is compared at step 28 in FIG. 3B to a predetermined maximum allowable drop count, $V_{max}$, as previously defined. If the total drop count minimum at step 28 is greater than $V_{max}$, then the color plane of the highest drop count, $D_{max1}$, of the group of drop counts for the colors C, Y, M and K is identified at step 30, reduced (decremented) in drop count at step 32 to its next lower value in the gray scale and the difference between the newly assigned gray scale number and the actually read gray scale number is used to produce a corresponding error diffusion at step 34. Thereafter, the new total drop count is updated at step 36 and then again compared to $V_{max}$ at step 38. If the total drop count at step 38 is now less than $V_{max}$, then the correct corresponding digital data is generated on line 40 and is used to drive a color ink jet printer 18 in FIG. 1. If the total drop count at step 38 is still greater than $V_{max}$, then a feedback signal generated in the feedback loop 42 is utilized to then again identify the color plane of the next existing highest C, Y, M, or K drop count at step 30 and the process in the loop 30, 32, 34, 36, 38 and 42 repeats itself.

If the total drop count at step 28 is now less than $V_{max}$, then the step 44 is operative to generate a total drop count sum of all the maximum drop count numbers in the gray table of FIG. 2B for each of the K, C, M and Y assigned pixel values. This sum of the total K, C, M and Y drop count maximums is then compared at step 46 to $V_{max}$. If this total drop count sum is less than $V_{max}$, a signal on line 48 is generated and is used to drive a color printer and no further signal processing is necessary. If, however, the total maximum drop count sum at step 46 is now greater than $V_{max}$, then the output signal on line 50 from step 46 is applied to step 52 and therein used to identify the color plane of the next highest individual drop count, $D_{max2}$, of each of the previously summed K, C, M and Y drop count maximums.

If there is then existing a lower drop count gray scale number at the same gray level within the table of FIG. 2B as determined in step 54, then a signal on line 56 from step 54 is generated and is used to decrement the drop count in step 58 by going to the next lower drop count maximum number within the same level of the gray table in FIG. 2B. If, however, no lower drop count number exists for the same level of gray scale as determined in step 54, then a signal generated on line 60 from step 58 is applied to the step 62 where it is used to reduce the drop count number by decrementing the level of the gray table in step 62 to its next lowest gray level wherein a new drop count maximum number is selected. Then, an output signal on line 64 is applied to the step 66 where an error diffusion is performed to generate an error diffusion signal on line 68. The signal on line 68 is applied to the next step 70 where the total drop count maximum is updated at step 70 and then fed to an output comparator 76. Here in the comparator 70 the updated total drop count number if again compared to $V_{max}$ to insure that the newly updated drop count number does not now still exceed $V_{max}$. If $V_{max}$ is not exceeded, a signal on line 74 is generated to drive the color printer. However, if the total drop count in step 70 still exceeds $V_{max}$, then a feedback signal on line 76 is returned via line 50 to the input of step 52 to again identify the color plane of the then xisting next highest drop count for each of the group of K, C, M and Y maximum drop count gray scale numbers.

The following code in TABLE I is referred to in the image processing art as a "pseudo code" and is a statement of all of the various steps described above with reference to FIGS. 3A and 3B:

TABLE I

```
for all rows (j)
for all columns (i)
{
read pixel values
{
black k(i,j)
cyan c(i,j)
magenta m(i,j)
yellow y(i,j)
}
threshold the pixel values to their nearest gray level entry table values such that:
{
k(i,j) = kg(i,j) + ke(i,j)
c(i,j) = cg(i,j) + ce(i,j)
m(i,j) = mg(i,j) + me(i,j)
y(i,j) = yg(i,j) + ye(i,j)
where
kg,cg,mg and yg are the available grey level table entry values of
black, cyan, magenta and yellow repectively
ke,ce,me and ye are the error difference between actual pixel
values and available grey level table values of black, cyan,
magenta and yellow respectively, all these values must be positive.
}
drop count assignment base on maximum allowable ink (MAX)
{
if((kg(i,j).count_min + cg(i,j).count_min + mg(i,j).count_min +yg(i,j).count_min) >MAX)
do
{
assign: kg_count = kg(i,j).count_min;
cg_count = cg(i,j).count_min;
mg_count = mg(i,j).count_min;
yg_count = yg(i,j).count_min;
identify the maximum of the set (kg_count, cg_count,mg_count);
decrement the max value to its next lower gray level table entry;
update gray level and count assignment;
do the correspondent error diffusion to the neighboring pixels;
} while(kg_count + cg_count + mg_count + yg_count) >MAX)
else
if(kg(i,j).count_max + cg(i,j).count_max + mg(i,j).count_max +yg(i,j).count_max) >MAX)
do
{
assign: kg_count = kg(i,j).count_max;
cg_count = cg(i,j).count_max;
mg_count = mg(i,j).count_max;
yg_count = yg(i,j).count_max;
identiy the maximum of the set (kg_count,cg_count,mg_count);
decrement the max value to its next lower table entry for the same gray level;
if next entry is not available, then decrement to the next
lower grey level and perform the corresponding error
diffusion;
update count assignment;
} while((kg count + cg count + mg count + yg count) >MAX)
else
{
assign: kg_count = kg(i,j).count_max;
cg_count = cg(i,j).count_max;
mg_count = mg(i,j).count_max;
yg_count = yg(i,j).count_max;
}
}
```

An example of the above minimum and maximum C, Y, M and K drop counting and initial gray scale assignment is as follows: Assume that the read pixel values on the 256 level gray scale are K=20, C=50, M=35 and Y=0. Converting these values to the 16 gray scale will yield K=1 plus a remainder of 4, C=3 plus a remainder of 2, M=2 plus a remainder of 3, and Y=0. The above remainders are diffused via error diffusion into the surrounding pixels and using the well known Floyd and Steinberg algorithm. This error diffusion is made into pixels surrounding the particular chosen pixel within the above gray levels of 1, 3 and 2. From the table in FIG. 2B, the drop count minimum for the above 1, 3, 2 and 0 levels of gray scale are $Kg_{min}=1$, $Cy_{min}=2$, $Mg_{min}=1$ and $Yg_{min}=0$ or a total minimum drop count of 4. The drop count maximum for these same levels of gray scale are $Kg_{max}=1$, $Cy_{max}=3$, $Mg_{max}=2$ and $Yg_{max}=0$, or a total maximum drop count of 6. Thus, if the maximum allowable drop count for each 2×2 super pixel is 8 drops, then the minimum (4) and maximum (6) drop count numbers give above will both be less than $V_{max}$ and a measurement of the total maximum drop count in step 46 of FIG. 3B will in turn generate an output signal on line 48 for directly controlling the color printer 18.

In another example of C, Y, M and K drop counting, assume that K=70, C=75, M=35 and Y=0. Converting these values to the 16 level gray scale will yield $Kg=4$ with a remainder $Ke=6$; $Cg=4$ with a remainder $Ke=11$; $Mg=2$ with a remainder $Me=3$; and $Yg=0$ with a remainder $Ye=0$. From the table in FIG. 2B, the drop count minimum for the above $Kg_{min}$, $Cg_{min}$, $Mg_{min}$ and $Yg_{min}$ values is $1+1+1+0=3$, whereas the drop count maximum for the above $Kg_{max}$, $Cg_{max}$, $Mg_{max}$ and $Yg_{max}$ values is $4+4+2+0=10$. Thus, if $V_{max}=8$, the drop count minimum output signal from step 26 is not greater than $V_{max}$, so that no drop count minimum output signal is applied from step 28 to step 30, and step 44 is now activated. However, since the drop count maximum of 10 exceeds a $V_{max}$ of 8, the now activated step 44 begins a maximum drop counting function as previously described above with reference to FIG. 3B. This operation in turn will activate the test step 46 and ask step 46 if a drop count of 10 is greater than a $V_{max}$ of 8. Since this answer is "yes", then step 52 is activated to identify the color plane of the highest drop count in this gray scale reading which is K=4, or the input data which is applied to step 54. Since a lower drop count does exist at the same gray scale level as the level for K=4, and this lower drop count is K=3 as indicated in the level 4, ¾ column in FIG. 2A, then a "yes" signal is generated on line 56 and is applied to step 58 which decrements the drop count to K=3. Step 58 reduces or decrements the new total drop count sum to 9 instead of 10. The updating of the new drop count sum is performed in step 70.

How, is the new drop count sum of 9 still greater than of $V_{max}$ of 8? The answer is "yes" as is indicated in step 72, and thus a feedback signal on line 76 is applied to step 52 to again identify the color plane of the next highest drop count. As indicated in the numbers of this example, the answer is C=4 and this information is applied to step 54 where C=4 is used to determine if a lower drop count for C or cyan exists at the same gray level in FIG. 2A as the level for C=4. Since the answer is "yes", the signal generated on line 56 is applied again to step 58 where C=4 is decremented to C=3 and then applied to step 70. In step 70 a new total drop count sum of 8 is generated and is applied to step 72 for receiving another new drop count comparison.

Since the new drop count total of 8 is not greater than a $V_{max}$ of 8, a "no" signal is generated on line 74 and is applied to either a color printer 18 in real time or stored in a printer storage file for subsequent use.

In yet a third example of C, Y, M and K drop counting, assume that the read pixel values are as follows: K=85, C=85, M=85, Y=0. Converting these values to the 16 level gray scale will yield $Kg=5+Ke=5$; $Cg=5+Ce=5$; $Mg=5+Me=5$; and $Yg=0$ and $Ye=0$. From the table in FIG. 2B, the drop count minimum for $Kg_{min}$, $Cg_{min}$, $Mg_{min}$ and $Yg_{min}$, respectively =$2+2+2+0=6$, and the drop count maximum for $Kg_{max}$, $Cg_{max}$, $Mg_{max}$ and $Yg_{max}$, respectively =$3+3+3+0=9$. Assume further for this particular example that $V_{max}=5$, so that the drop count minimum sum is greater than $V_{max}$ and a "yes" output signal is generated on line 29 and applied to step 30 to thereby activate the subsequent steps 32, 34, 36, 38, and feedback loop 42 as previously described. Here in this loop containing steps 30, 32, 34, 36, 38 and feedback line 42 the drop count minimum selection from the gray table of FIG. 2B will be decremented as previously described until a "no" output signal is generated on the output line 40 from the yes/no test step 38.

When using a multidrop color imaging system such as the one described in the above U.S. Pat. No. 4,680,645 issued to Dispoto et al. which fires drops on top of drops in a single pixel, the drop count and dye loading selection process is complete at this point. However, when the drops are fired into super pixels such as a 2×2 super pixel, the fired drops must now be assigned to a desired pixel quadrant as they are sequentially fired in to the super pixel. This operation is described below with reference to FIG. 4.

Figure 4:
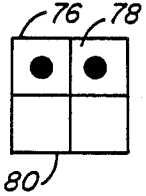
FIG. 4 is a matrix showing three rows and four columns of 2×2 super pixels to illustrate the assignment of ink drops to each pixel based upon the value of the digits in each assigned gray scale digital number.

FIG. 4 shows a matrix of 12 color planes of 2×2 super pixels including three rows of high, medium, and low dye loadings versus four columns of black, cyan, magenta and yellow colors. Although these twelve super pixels are shown as being physically separated in FIG. 4, it will be understood by those skilled in the art that these super pixels are all superimposed on one another in the print scanning operation described below and thereby actually occupy the same space on the print media. Accordingly, the physical separation of these twelve super pixels in FIG. 4 is made for purposes of explanation only.

These super pixels are sequentially addressed from left to right and starting at the top or H row and then proceeding vertically down through the M & L rows in the normal manner of scanning a printed surface area. These 12 super pixels represent the timed sequence of successive dot printing in order to achieve a minimum of color contrast on a printed page. The black, cyan, magenta and yellow colors are arbitrarily assigned designated digits of 0, 1, 2 and 3, respectively, whereas the high, medium and low levels of dye loading are assigned weighted units of 0, 1 and 2 respectively. Thus, when one is printing sequentially from left to right and then scanning vertically down the matrix in FIG. 4, the individually assigned pixels for receiving successive drops of ink are continuously changed in a clockwise rotation in moving from pixel to pixel. In this manner, each successively printed pixel receives in succession (and in accordance with its assigned gray scale drop count number) the colors C, Y, M and black cycled in order through the high, medium and low dye loadings.

The firing sequence of the color printhead of the ink jet printer under control is continuously controlled to print the next adjacent quadrant of each super pixel as each super pixel is printed in succession. This clockwise (or counter clockwise) clocking action continues to rotate the location of each next printed individual pixel to the next super pixel quadrant, so that each successively printed drop of ink is rotated to the next adjacent quadrant of each super pixel until all of the scanned super 2×2 pixels are printed in succession. In this manner, the ink is distributed over the entire super pixel matrix in FIG. 4 in a highly uniform manner, and this operation minimizes the ink volume per unit of printed area ratio for an ink jet printing operation. This action The above pixel selection process described with reference to FIG. 4 is defined in code form by the following pseudo code shown in the table below for the 2×2 super pixel assignment-defining data structure.

TABLE II

```
Pseudo code for 2X2 Super-pixel assignment
defining data structure
d[plane][level];
        /* plane: 0 = > black              */
        /*  1 = > cyan                     */
        /*  2 => magenta                   */
        /*  3 => yellow                    */
        /* level: 0 = > high               */
        /*  1 = > medium                   */
        /*  2 = > low                      */
super_pixel[plane][level][location];
        /* plane : defined as above        */
        /* level : defined as above        */
        /* location : 0 = > top left       */
        /*     1 = > top right             */
        /*     2 = > bottom right          */
        /*     3 = > bottom left           */
kount = 0;
for j = 0 to 2                            /* gray level */
    for i = 0 to 3                        /* color plane */
        if ( d[i][j]> 0 )
        {
        for k= 1 to d[i][j]
        (location = kount mod 4           ;
        super_pixel[i][j][location]=1;    /* 1 = >presence other = >absence
                                          */
        kount = kount + 1 ;
        }
        }
``` in turn simultaneously minimizes both paper cockleing and color contrast or grainyness of the printed hardcopy output from an ink jet printer.

The above operation will be better understood with reference to an example of the finally adjusted gray scale information which is applied to the color printer or printer storage file 18 from one of the input lines 40, 48 or 74 connected thereto as shown in FIG. 3B. As shown in the example of FIG. 4, assume that the "High" column of K, C, M and Y data is 2, 2, 1, 0, that the "Medium" column of K, C, M, and Y data is 2, 2, 0, 1 and that the "Low" column of K, C, M, Y data is 0, 0, 2, 0. Using this gray scale K, C, M and Y information, the pixel rotational and scanning operation will proceed as follows: The K=2 in the "High" dye loading column will eject drops into quadrants 76 and 78 of the super pixel 80. Then, rotating clockwise, the C=2 "High" dye loading will eject drops in the next clockwise adjacent quadrants 82 and 84 of the next super pixel 86. For M=1 in the "High" column, a drop is ejected in adjacent quadrant 88 of the next adjacent super pixel 90. Then, for Y=0 the next super pixel 92 is skipped.

Next the "Medium" dye loading column is addressed and K=2 therein puts drops in quadrants 94 and 96 in super pixel 98; C=2 puts drops in the next adjacent clockwise quadrants 100 and 102 of the next super pixel 104; M=0 causes the next super pixel 106 to be skipped; and Y=1 then puts a drop in quadrant of super pixel 110.

Continuing, a "Low" column K=0 and C=0 causes super pixels 112 and 114 to be skipped, respectively; a low M=2 puts drops in the next adjacent clockwise quadrants 116 and 118 of the next super pixel 120 and a low Y=0 causes the last pixel 122 of the matrix to be skipped. Then the above described operation is repeated for the next received gray scale data applied to the printer 18.

The scheme of dots assignment to a 2×2 super-pixel is to assign the dots counts in the sequence of their highest gray level plane from black, cyan, magenta to yellow. This scheme is then repeated as described in the example given above for medium and low gray level.

Various modifications may be made in the above described embodiment without departing from the scope of this invention. As an example, a different dye loading ratio of 8:3:1 may be used with a 32 level gray scale and with a 2×2 super pixel in accordance with the above teachings. In addition, this invention may be used with different size drop volumes or with multi-drop formatting where the print area is only a single pixel. However, in the multi-drop printing process, higher print frequencies are required as compared to those required by the present invention. Also, the present invention is not limited to use by thermal ink jet printers, and may be used with other different types of ink jet printers such as thermal transfer or piezoelectric ink jet printers.

The present invention may also be modified by one skilled in the art to make it adaptable for use with different ink drop volumes (e.g. 160, 80 and 40 picoliters) such as those described in commonly assigned U.S. Pat. No. 4,746,935 issued to Ross R. Allen. Using a suitable modification of the data processing methodology shown in FIGS. 3A and 3B, it is possible to accommodate the used of multiple drop sizes with or without the use of multiple gray levels.

In priority of selecting the highest drop count from the (C, Y, M, K) colors, there may be an advantage to modify this set to only (C, M, Y) colors only and to leave the black or K plane of information intact. This is because the black plane contains most of the resolution information, and this is especially true for the case of 100% UCR where the error diffusion of the color plane will only slightly alter the chromaticity of the printed image. Additionally, the visual perception is more sensitive to resolution than it is to color information.

Finally, as a practical matter, the yellow gray scale is of least importance, so from both a hardware and a software standpoint, a single dye level of yellow would be acceptable.

We claim:

1. A method for decreasing color contrast in a printed image which includes:
   a. generating cyan, yellow, magenta and black pixel information,
   b. assigning said information a gray scale drop count number based upon a count of ink drops having a known dye loading and the dye loading thereof,
   c. decrementing said drop count number to a lower level number on said gray scale in response to a measure of the available number of ink drops and the dye loading representative of cyan, yellow, magenta and black pixel information, and
   d. ejecting a volume of ink into a selected print area which corresponds to said lower level number on said gray scale.

2. The method defined in claim 1 which further includes assigning each digit of the decremented lower level gray scale number to a selected pixel within a larger or super pixel and based upon the value of said digit, and continuously rotating successively assigned printed pixels to the next adjacent quadrant in successively printed super pixels.

3. A method for decreasing color contrast in a printed image derived from cyan, yellow, magenta and black pixel data and represented by a corresponding plurality of cyan, yellow, magenta and black drop count numbers in a gray scale which includes assigning each digit of an adjusted drop count number within a gray scale to a selected pixel within a larger or super pixel and based upon the value of said digit, and continuously rotating each successively printed pixel to the next adjacent quadrant of each successively printed super pixel containing individually printed pixels while ejecting a quantity of ink into said super pixel which corresponds to said adjusted drop count number.

4. The method defined in claim 3 which further includes generating said adjusted drop count number by:
   a. generating cyan, yellow, magenta and black pixel information representative of a scanned image,
   b. assigning said information a gray scale number based upon a count of ink drops having a known dye loading and the dye loading thereof, and
   c. decrementing said gray scale number to a lower level number on said gray scale in response to a measure of said number of ink drops and the dye loading thereof representative of cyan, yellow, magenta and black pixel information.

5. A method for converting cyan, yellow, magenta and black pixel data into a printed color image comprising the steps of:
   a. providing cyan, yellow, magenta and black pixel information values corresponding to a scanned image,
   b. assigning said pixel values their nearest corresponding gray scale value and a drop count number corresponding thereto,
   c. performing an error diffusion for the remainder difference between said pixel information values in (a) above and said assigned gray scale values,
   d. comparing the sum of the minimum drop count numbers for each of said cyan, yellow, magenta and black assigned gray scale numbers to a predetermined selectable maximum allowable drop count, $V_{max}$,
   e. identifying the maximum drop count number, $D_{max1}$, of a set of $Kg_{min}$, $Cg_{min}$, $Mg_{min}$ and $Yg_{min}$ assigned minimum gray scale numbers if the sum total of said drop count numbers is greater than $V_{max}$,
   f. decrementing $D_{max1}$ to its next lower gray level entry,
   g. updating the new count assignment,
   h. providing another error diffusion to the surrounding pixels,
   i. comparing the sum of the maximum drop count numbers for each of said $Cg_{max}$, $Yg_{max}$, $Mg_{max}$ and $Kg_{max}$ assigned maximum gray scale numbers to $V_{max}$,
   j. identifying the maximum drop count number, $D_{max2}$, within a set of $Cg_{max}$, $Yg_{max}$, $Mg_{max}$ and $Kg_{max}$ assigned maximum gray scale numbers if the sum total of said maximum $Cg_{max}$, $Yg_{max}$, $Mg_{max}$ and $Kg_{max}$ drop count numbers is greater than $V_{max}$,
   k. decrementing $D_{max2}$ to its next lower gray level entry for the same gray level, and if this entry is not available for the same gray level then decrementing $D_{max2}$ to the next lower gray level within said gray scale,
   l. updating the new count assignment,
   m. providing another error diffusion, and
   n. assigning each digit within each gray scale number of the last updated count assignment in either step g or step 1 above to a predetermined pixel within a larger super pixel and determined by the value of said digit of each updated gray scale number for controlling the distribution of ink drops ejected into pixels within said larger super pixel.

6. The method defined in claim 5 wherein the distribution control in step n is provided by a continuous rotation of each successively selected pixel to the next adjacent quadrant for each successively printed super pixel.

7. A method for minimizing paper cockleing during an ink jet printing operation which includes:
   a. selecting a print area on a print medium for receiving a predetermined maximum ejected quantity of ink, $V_{max}$, where $V_{max}$ is equal to a predetermined maximum allowable drop volume of ink for a given area of print media corresponding to a minimum of paper cockleing,
   b. converting scanned image data to a gray scale digital number corresponding to an ink volume which does not exceed $V_{max}$ when introduced into said print area, and
   c. diffusing into areas surrounding said print area a quantity of ink equal to the difference between an actual gray scale number representative of said scanned image and said gray scale number in (b) above.

8. A method for matching an ink loaded drop to a selected print area for receiving said drop in a manner to optimize print quality from an ink jet printing operation which comprises the steps of:
   a. selecting a maximum allowable ink drop volume, $V_{max}$, to be received by said selected print area within a chosen print medium,
   b. scanning an image to generate digital data representative thereof, c. converting said digital data to gray scale digital information, and d. processing said digital information in such a manner as to prevent the volume of said ink loaded drop from exceeding $V_{max}$, where $V_{max}$ is the maximum allowable drop volume ejected into said selected print area under the control of the processed digital information in (c) above.

9. A method for printing out a scanned image which comprises the steps of:

a. generating gray scale digital data representative of said scanned image, b. providing a plurality of different gray scale entry level numbers representative of different available combinations of drop count and associated dye loadings for a corresponding plurality of different levels of a chosen gray table, c. selecting an available drop count and dye loading entry level number within a selected level of said gray table which does not exceed $V_{max}$, d. providing a matrix of pixels consisting of a predetermined number of sub-pixels, and e. selecting for ink printing chosen sub-pixels based upon said entry level number in (c) above.

10. The method defined in claim 9 which includes scanning rows and columns of said matrix of pixels during said printing operation and rotating the address of sub-pixels within each successively addressed pixel as a function of the value of said individual digits within said gray scale digital data.

11. The method defined in claim 10 wherein said matrix of pixels comprises rows representative of high, medium and low dye loadings for said ink and columns corresponding to black, cyan, magenta and yellow colors of ink.

12. A method for ink jet printing which comprises the steps of:

a. providing a plurality of different gray scale entry level numbers representative of different available combinations of drop count and associated dye loadings for a corresponding plurality of different levels of a chosen gray table, b. selecting an available drop count and dye loading entry level number within a selected level of said gray table which does not exceed $V_{max}$, c. providing a matrix of sub-divided super pixels, d. scanning said matrix when printing an image, and e. rotating the ejection of ink within sub-divided areas of successively printed super pixels.

13. The method defined in claim 12 wherein the ink ejection rotation is controlled in accordance with the value of selected gray scale scale numbers of a chosen gray level table.

14. The method defined in claim 13 which further includes:

a. generating cyan, yellow, magenta and black pixel information, b. assigning said information a gray scale drop count number based upon a count of ink drops and the dye loading thereof, and c. decrementing said drop count number to a lower level number on said gray scale in response to a measure of the available number of ink drops and the dye loading representative of cyan, yellow, magenta and black pixel information.

15. A method for converting scanned image information to a hardcopy printout which comprises ejecting ink onto a print medium in a pixel address sequence thereon controlled by the value of gray scale digital numbers to which said image information is assigned, said method including the steps of:

a. selecting a print area on a print medium for receiving a predetermined maximum ejected quantity of ink, $V_{max}$, b. converting scanned image data to a gray scale digital number corresponding to ink volumes which do not exceed $V_{max}$ when introduced into said print area, and c. diffusing into areas surrounding said print area a quantity of ink equal to the difference between an actual gray scale number representative of said scanned image and said gray scale digital number in (b) above.

16. The method defined in claim 15 which also includes:

a. selecting a maximum allowable ink drop volume, $V_{max}$, to be received by said selected print area within a chosen print medium, b. scanning an image to generate digital data representative thereof, c. converting said digital data to gray scale digital information, and d. processing said digital information in such a manner as to prevent the volume of said ink loaded drop from exceeding $V_{max}$.

17. The method defined in claim 16 which also includes scanning rows and columns of a matrix of pixels during said printing operation and rotating the address of sub-pixels within each successively addressed pixel as a function of the value of said individual digits within said gray scale digital data.

18. The method defined in claim 17 wherein said matrix of pixels comprises rows representative of high, medium and low dye loadings for said ink and columns corresponding to black, cyan, magenta and yellow colors of ink.

19. An image conversion system for converting scanned image information to a hardcopy printout from an ink printer and wherein said scanned image information is initially converted to cyan, yellow, magenta and black pixel information, characterized in that error diffusion and pixel assignment gray scaling means are connected in said image conversion system for receiving said pixel information and for driving an ink printer or storage file therefor, said gray scaling means providing an input control signal to a color printer for causing said color printer to eject ink onto a print medium in a pixel address sequence thereon controlled by the value of gray scale digital numbers to which said scanned image information is assigned.

20. The system defined in claim 19 which also includes:

a. means for selecting a print area on a print medium for receiving a predetermined maximum ejected quantity of ink, $V_{max}$, and b. means connected to said selecting means for converting scanned image data to a gray scale digital number corresponding to ink volumes which do not exceed $V_{max}$ when introduced into said print area.

21. The system defined in claim 20 which also includes:

a. means for scanning an image to generate digital data representative thereof, b. means connected to said scanning means for converting said digital data to gray scale digital information, and c. means connected to said converting means for processing said digital information in such a manner as to prevent the volume of said ink loaded drop from exceeding $V_{max}$.

22. The system defined in claim 19 which also includes:

a. means within said image conversion system for generating gray scale digital data representative of said scanned image information, and b. means connected to said generating means for providing a matrix of pixels consisting of a predetermined number of sub-pixels, and selecting for ink printing chosen sub-pixels based upon the value of individual digits within said gray scale digital numbers.

23. The system defined in claim 22 which also includes means for scanning rows and columns of said matrix of pixels during said printing operation and rotating the address of sub-pixels within each successively addressed pixel as a function of the value of said individual digits within said gray scale digital data.

24. The system defined in claim 23 wherein said matrix of pixels comprises rows representative of high, medium and low dye loadings for said ink and columns corresponding to black, cyan, magenta and yellow colors of ink.

25. An image conversion system for converting scanned image information to a hardcopy printout from an ink printer and wherein said scanned image information is initially converted to cyan, yellow, magenta and black pixel information and characterized in that error diffusion and pixel assignment gray scaling means are connected in said image conversion system for receiving said pixel information and for driving an ink printer or storage file therefor, said gray scaling means includes:

a. means for assigning said information a gray scale drop count number based upon a count of ink drops having a known dye loading and the dye loading thereof, and b. means connected to said assigning means for decrementing said drop count number to a lower level number on said gray scale in response to a measure of the available number of ink drops and the dye loading representative of cyan, yellow, magenta and black pixel information.

26. The system defined in claim 25 which further includes means connected to said decrementing means for assigning each digit of the decremented lower level gray scale number to a selected pixel within a larger or super pixel and based upon the value of said digit, and continuously rotating successively assigned printed pixels to the next adjacent quadrant in successively printed super pixels.

27. An image conversion system for matching an ink loaded drop to a selected print area for receiving said drop in a manner to optimize print quality from an ink jet printing operation which comprises:

a. means for scanning an image to generate digital data representative thereof, b. means connected to said scanning means for converting said digital data to gray scale digital information, and c. means connected to said converting means for processing said digital information in such a manner as to control the ink ejected from a color ink jet printer and to simultaneously prevent the volume of said ink loaded drop from exceeding a preselected maximum allowable ink drop volume $V_{max}$.

28. An image conversion system for ink jet printing which comprises:

a. means for providing a matrix of sub-divided super pixels, b. means operatively associated with said matrix of sub-divided super pixels for scanning said matrix when printing an image, and c. means within said scanning means for rotating the ejection of ink within sub-divided areas of successively printed super pixels and for ejecting a quantity of ink onto said super pixels which does not exceed a predetermined maximum allowable ink drop volume, $V_{max}$ which is related to a minimum amount of paper cockleing where the ink is printed.

29. The system defined in claim 28 wherein the ink ejection rotation is controlled in accordance with the value of selected gray scale numbers of a chosen gray level table.

30. The system defined in claim 29 which further includes:

a. means for generating cyan, yellow, magenta and black pixel information, b. means connected to receive said pixel information for assigning said information a gray scale drop count number based upon a count of ink drops and the dye loading thereof, and c. means connected to said assigning means for decrementing said drop count number to a lower level number on said gray scale in response to a measure of the available number of ink drops and the dye loading representative of cyan, yellow, magenta and black pixel information.

31. A method for improving print quality during ink jet printing which comprises the steps of:

a. providing a plurality of different gray scale entry level numbers representative of different available combinations of drop count and associated dye loadings for a corresponding plurality of different levels of a chosen gray table, and b. selecting an available drop count and dye loading entry level number within a selected level of said gray table which does not exceed a predetermined maximum allowable drop volume, $V_{max}$, and c. and utilizing said entry level number to control the ejection of ink onto a print medium.

32. A method for improving print quality on a print medium resulting from color ink jet printing by introducing ink into selected print areas thereon and not to exceed a predetermined maximum allowable drop volume, $V_{max}$, comprising:

a. providing color pixel information values corresponding to a scanned image, b. providing a plurality of different gray scale entry level numbers representative of different available combinations of drop count and associated dye loadings for a corresponding plurality of different levels of a chosen gray table, c. selecting an available drop count and dye loading entry level number within a level of said gray table which does not exceed $V_{max}$, d. ejecting a volume of ink onto said selected print areas of said print medium corresponding to said entry level number within (c) above, and e. diffusing into areas surrounding said print areas a quantity of ink equal to the difference between an actual gray scale number representative of said scanned image and said entry level number in (c) above.

33. A method for color ink jet printing which improves the print quality and resolution of ink jet printed media which comprises the steps of:
   a. providing cyan, yellow, magenta and black pixel information values corresponding to a scanned image,
   b. assigning said pixel values their nearest corresponding gray scale value and a drop count number corresponding thereto,
   c. ejecting ink onto a selected area of a print medium which does not exceed a predetermined maximum allowable drop volume, $V_{max}$, in order to prevent paper cockleing, and
   d. performing an error diffusion into areas of said print medium surrounding said selected print areas which corresponds to the difference between said pixel information values correspondingto said scanned image in (a) above and the assigned pixel values in (b) above.

34. A method for improving print quality on a print medium resulting from color ink jet printing by introducing ink into selected print areas thereon and not to exceed a predetermined maximum allowable drop volume, $V_{max}$, comprising:
   a. providing color pixel information values corresponding to a scanned image,
   b. selecting a gray level gray scale drop count and dye loading number and an associated ink volume, V, corresponding to said color pixel information values,
   c. introducing said ink volume V into said selected print areas if V is equal to or less than $V_{max}$,
   d. selecting another different gray level gray scale drop count and dye loading number if V exceeds $V_{max}$ and having a gray table ink drop volume which does not exceed $V_{max}$,
   e. introducing said gray table ink drop volume in (d) above into said selected print areas, and
   f. diffusing into areas of said print medium surrounding said selected areas a quantity of ink proportional to the difference between the pixel information valves in (a) above and the selected number in either (b) or (d) above, whereby the resolution of a printed image on said print medium is preserved and the paper cockleing therein is minimized.

35. The method defined in claim 34 which further includes:
   a. providing a plurality of different gray scale entry level numbers representaive of different available combinations of drop count and associated dye loadings for a corresponding plurality of different gray scale values and levels of a chosen gray table, and
   b. selecting an available drop count and dye loading entry level number within a certain level of said gray table which does not exceed $V_{max}$.

36. A method for simultaneously minimizing color contrast and paper cockleing during ink jet printing which comprises the steps of:
   a. scanning an image to provide pixel information values of one or more colors existent in said image,
   b. providing a plurality of different gray scale entry level numbers representative of different available combinations of ink drop count numbers and their associated dye loadings for each color and within a corresponding plurality of different levels of a chosen gray table,
   c. establishing a predetermined maximum allowable drop volume of ink, $V_{max}$, which may be received on a printed area with a minimum of or no paper cockleing, and
   d. selecting for printing the maximum drop count number for each of said colors within said available combinations of drop count numbers so that the sum of all drop count numbers does not exceed $V_{max}$, whereby more drops having a lower gray scale value and lower dye loading may be distributed over a larger pixel area or super pixel area to minimize color contrast and grainyness therein.

37. The process defined in claim 36 wherein one or more colors are selected from the group of colors consisting of cyan, yellow, magenta and black.

* * * * *